March 9, 1965  C. E. KNIGHT  3,172,171
CONNECTOR
Filed Sept. 11, 1961  2 Sheets-Sheet 1
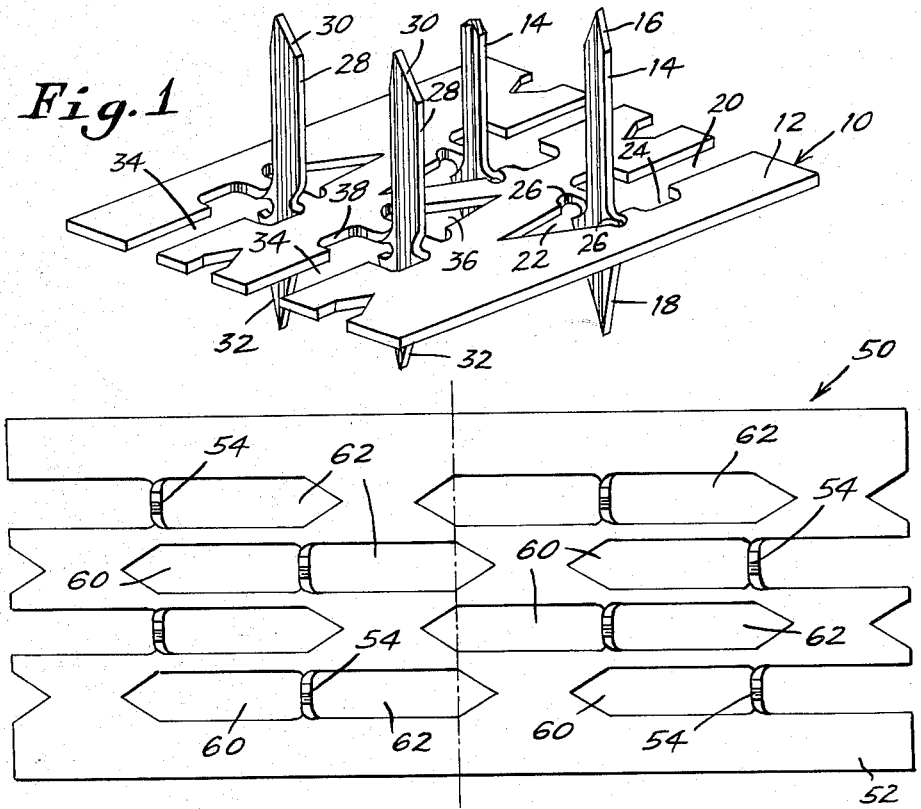
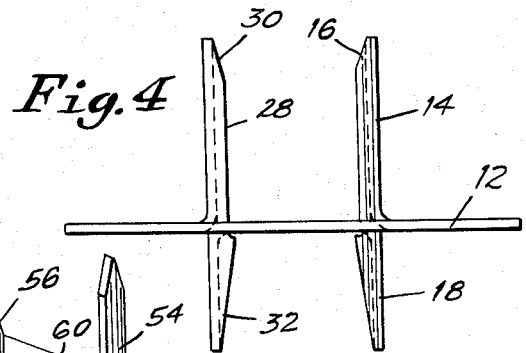
INVENTOR
Clarence E. Knight,
BY Diggins + Le Blanc
ATTORNEYS March 9, 1965 C. E. KNIGHT 3,172,171
CONNECTOR Filed Sept. 11, 1961 2 Sheets-Sheet 2

INVENTOR
*Clarence E. Knight,*
BY *Diggins + LeBlanc*
ATTORNEYS

United States Patent Office 3,172,171
Patented Mar. 9, 1965

3,172,171
CONNECTOR
Clarence E. Knight, Hialeah, Fla., assignor to Automated Building Components, Inc., Miami, Fla., a corporation of Florida
Filed Sept. 11, 1961, Ser. No. 137,426
8 Claims. (Cl. 20—92)

This invention relates to metal connectors and more particularly relates to connectors for connecting and joining timber members in a laminating fashion.

In assignee's copending applications Serial Nos. 798,261, filed March 9, 1959 and 799,783, filed March 16, 1959, now both abandoned, there are disclosed metal connector plates suitable for use in the formation of laminated and lap joints of timber members, for example, in the forming of laminated beams or in the attachment of panel board to wooden framing. Both of these connectors envision the use of a metal plate having at least two series of teeth struck therefrom, the first series of teeth extending substantially normal to the top of the plate and the second series of teeth extending substantially normal to the bottom of the plate. The teeth of these connectors are formed in different manners and in different patterns in the two applications and are used for different purposes. These applications also disclose structural assemblies that can be produced by utilizing the connector plates disclosed.

While the different connector plates of both of these copending applications are entirely satisfactory in operation, it has now been found that a connector plate can be provided that has even greater stress bearing capabilities and in which a greater number of teeth can be provided from a given size plate. Due to the greater relative strength of this connector, thinner metal can be used in its manufacture with a consequent saving of cost.

It is accordingly a primary object of the present invention to provide an improved connector for forming lap joints between wooden members.

It is another object of the present invention to provide a unitary, integral metal connector capable of serving as the sole connecting element in a lap joint between wooden stress bearing members.

It is still another object of the invention to provide a unitary, integral connector which may serve as the sole connecting member between timber members in various types of structures.

It is another object of the present invention to provide an easily assembled structural connector which is considerably thinner than previously used connectors.

These and further objects and advantages of the present invention will become more apparent upon reference to the following specification and claims and appended drawings wherein:

FIGURE 1 is a perspective view of a first modification of the connector of the present invention;

FIGURE 4 is a side elevation of the connector of FIGURE 1;

FIGURE 5 is a perspective view of another modification of the connector of the present invention; and FIGURE 6 is a plan view of a connector similar to that shown in FIGURE 5 and having more teeth.

Figure 2:
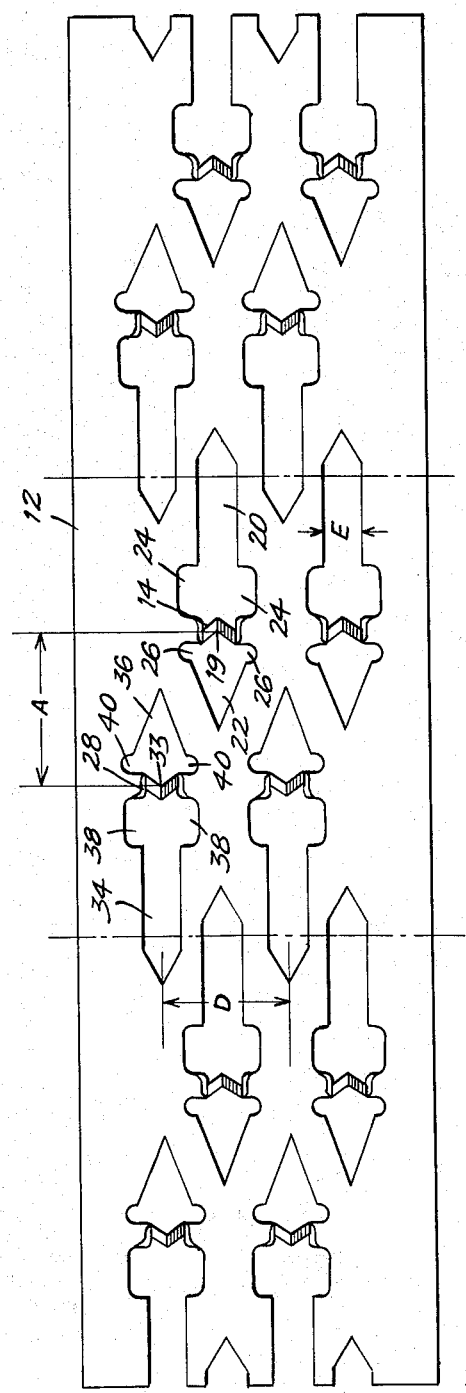
FIGURE 2 is a plan view of a connector similar to that shown in FIGURE 1 and having more teeth.
Figure 3:
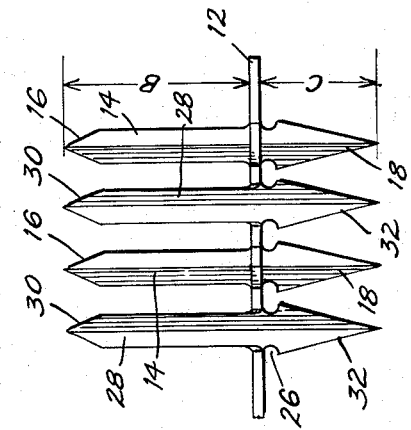
FIGURE 3 is a front elevation of the connector of FIGURE 1.

Referring now to FIGURES 1 through 4, a connector 10 is shown which has a plurality of teeth struck from a metal plate 12. A first series of teeth 14 have nail-like portions 16 extending normal to the top surface of the plate 12 and a barbed portion 18 extending normal to the lower surface of the plate 12. The teeth 14 are V-shaped with the apex 16 of the V pointed towards one end of the plate, in this case, towards the right-hand end. This V shape gives the teeth greater strength and thus enables the plate 12 to be made of thinner metal.

The two portions 16 and 18 of the tooth 14 are struck simultaneously from the plate 12 so that the entire tooth 14 is in effect spun relative to the plate 12 rather than the two portions being individually bent relative to the plate 12. In this manner, the two portions form a straight line and thus can better transmit stress. When the portions 16 and 18 are struck from the plate 12, they leave slots 20 and 22 in the plate. The shape of the nail-like portion 16 of the tooth is defined in the spinning area by a pair of prepunched holes 24 which are preferably generally rectangular in shape. In a similar manner, a pair of circular holes 26 are prepunched in the spinning area of the barbed portion of the tooth and in fact give this portion its barbed shape.

A second series of teeth 28 are also struck from the plate 12. These teeth have a nail-shaped portion 30 extending normal to the top surface of the plate 12 and a barbed portion 32 extending normal to the bottom surface of the plate 12. The teeth 28 are also V-shaped in cross-section; however, the apex 33 of this V is pointed in the opposite direction to that of the teeth 14, in this case towards the left end of the plate 12. The teeth 28 are also struck from the plate in such a manner that the entire tooth is spun relative to the plate rather than having the individual portions bent relative to the plate. As is the case with the teeth 14, the two portions 30 and 32 of the teeth 28 form a straight line giving rise to a straight-through stress bearing member and thus endowing the connector with a greater strength and enabling it to be made with thinner material.

When the teeth 28 are struck from the plate 12, the portions 30 and 32 leave slots 34 and 36 respectively in the plate. As was the case with the teeth 14, holes 38 and 40 are prepunched in the plate to give the portions of the teeth their proper shape in the spinning area. As can be seen, the slot 36 extends between the slots 22, thus enabling a greater number of nails to be struck from a plate of a given size.

Referring to FIGURES 5 and 6, another embodiment of the present invention is shown. The connector of FIGURE 5 is shown as a section struck from the connector shown in FIGURE 6. In this embodiment, a connector 50 is formed by a plate 52 having a plurality of nails 54 struck therefrom. Teeth 54 have two portions 56 and 58, the first of which extends normal to the top surface of the plate and the second of which extends normal to the bottom surface of the plate. Both of these portions are nail-like and form a straight line, thus increasing the stress bearing capability of the connector. When the teeth 54 are struck from the plate 52, the portions 56 leave a slot 60 and the portions 58 leave a slot 62 in the plate. As may be seen, these slots are wider than the teeth struck therefrom. The bridging portions 64 provide enough metal for the spinning operation without causing the teeth to be sheared from the plate, as would be the case if no such portion were provided. These slots can be alternated so that a great number of nails can be struck from a small plate.

In all embodiments of the connectors of this invention, it is important that the slots left after the teeth are formed are wider than the teeth at the point of attachment of the teeth to the plate. This provides bridging portions between the teeth and the plate which permits the spinning operation. Without these widened slot portions, it is impossible to spin the teeth perpendicular to the plate wtihout at least partially shearing the teeth from the plate.

It is also advantageous to use the staggered tooth arrangement, particularly in embodiments where only a portion of the slots is wider than the teeth, such as, for example, the embodiment of FIGURE 2. With this type of arrangement, adjacent rows of teeth may be very closely spaced, thereby obtaining a maximum number of teeth for a given area of plate. Inspection of the embodiment of the invention illustrated in FIGURE 2 will demonstrate that a line drawn between adjacent rows of teeth parallel to the rows intersects the widened portions of the slots of both rows. This results in a very high percentage of the metal in the plate being used to form teeth.

As a specific example of a connector formed according to the embodiment of the invention illustrated in FIGURES 1 through 4, the plate 12 may be formed of 20-gauge galvanized steel, the dimension A between the apexes of the V-shaped teeth is .507 inch, the dimension B between the upper surface of the plate 12 and the points of the tooth portions 16 is .550 inch, the dimension C between the bottom surface of the plate and the points of the barbed portions 18 of the tooth is .3125 inch, the dimension D between the center lines of the teeth may be .400 inch and the dimension E, the width of the slots 20 and 34, may be .112 inch.

From the foregoing description, it can be seen that a new and improved connector for joining wooden timbers has been provided. This connector provides teeth that are perfectly straight along their entire length and whose length is perpendicular to the metal plate from which they are struck. This enables the teeth to transmit a greater stress and thus makes the plate stronger than any known heretofore. Due to this increased strength, the plate can be made of thinner material with the consequent saving in cost. The teeth can be formed in any desired shape and can be V-shaped to impart a greater strength to the connector. By using staggered rows of teeth and slot shapes wherein the base of the slot is wider than the tooth at the point of attachment, a very large number of teeth may be obtained for a given area of metal.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A connector adapted to be used as the sole stress transmitting member in a structural joint comprising a plate having a pair of substantially parallel surfaces defining opposite sides of said plate, a plurality of teeth struck from said plate leaving slots in said plate extending away from the point of attachment of said teeth to said plate, each of said teeth having a first portion on one side of said plate and a second portion on the other side of said plate, said first portion extending substantially normal to one of said plate surfaces, said second portion extending substantially normal to the other of said plate surfaces, said first and second portions of said tooth being substantially co-linear and defining a straight, continuous, elongated solid nail structure.

2. A connector adapted to be used as the sole stress transmitting member in a structural joint comprising a plate having a pair of substantially parallel surfaces defining opposite sides of said plate, a plurality of teeth struck from said plate leaving slots in said plate extending away from the point of attachment of said teeth to said plate, said teeth being V-shaped in cross-section and having a first portion on one side of said plate and a second portion on the other side of said plate, said first portion extending substantially normal to one of said plate surfaces, said second portion extending substantially normal to the other of said plate surfaces, said first and second portions being substantially co-linear and defining a straight, continuous, elongated solid nail structure.

3. A connector adapted to be used as the sole stress transmitting member in a structural joint comprising a plate having a pair of substantially parallel surfaces defining opposite sides of said plate, a first series of teeth struck from said plate leaving slots in said plate extending away from the point of attachment of said teeth to said plate, each of said teeth of said first series being V-shaped in cross-section with the apex of the V pointed in a first direction, a second series of teeth struck from said plate, each of said teeth of said second series being V-shaped in cross-section with the apex of the V pointed in a second direction, all of said teeth having a first portion on one side of said plate and a second portion on the other side of said plate, said first portions extending substantially normal to one of said plate surfaces, said second portions extending substantially normal to the other of said plate surfaces, the first and second portions of each tooth being substantially co-linear and defining a straight, continuous, elongated solid nail structure.

4. A connector adapted to be used as the sole stress transmitting member in a structural joint comprising a plate having a pair of substantially parallel surfaces defining opposite sides of said plate, a plurality of teeth struck from said plate leaving slots in said plate extending away from the point of attachment of said teeth to said plate, each of said teeth having a first portion on one side of said plate and a second portion on the other side of said plate, said first portion having a barbed end and extending substantially normal to one of said plate surfaces, said second portion being nail-like and extending substantially normal to the other of said plate surfaces, said first and second portions of said tooth being substantially co-linear and defining a straight, continuous, elongated solid nail structure.

5. The connector of claim 4 wherein said first portions of said teeth are shorter than said second portions.

6. A connector plate comprising a plate having a pair of substantially parallel surfaces defining opposite sides of said plate, a plurality of teeth struck from said plate, each of said teeth having a first portion on one side of said plate and a second portion on the other side of said plate, said first portion extending substantially normal to one of said plate surfaces and said second portion extending substantially normal to the other of said plate surfaces, said teeth leaving slots in said plate extending away from the point of attachment of said teeth to said plate, said slots being wider than said teeth at least adjacent the point of attachment of said teeth to said plate, said first and second portions of said teeth being substantially colinear and defining a straight, continuous, elongated solid nail structure.

7. A connector plate comprising a plate having a pair of substantially parallel surfaces defining opposite sides of said plate, a plurality of teeth struck from said plate, each of said teeth having a first portion on one side of said plate and a second portion on the other side of said plate, said first portion extending substantially normal to one of said plate surfaces and said second portion extending substantially normal to the other of said plate surfaces, said teeth leaving slots in said plate extending away from the point of attachment of said teeth to said plate, said slots being wider than said teeth at least adjacent the point of attachment of said teeth to said plate to form bridging portions between said teeth and said plate, said bridging portions having substantially a 90-degree twist therein whereby said first and second portions of said teeth are substantially colinear and defining a straight, continuous, elongated solid nail structure.

8. A connector plate as set out in claim 7 wherein said teeth are arranged in a plurality of rows, the teeth in adjacent rows being staggered relative to one another and said rows being so spaced and said slots being so wide, at least at said widened portions, that a line drawn between adjacent rows of teeth parallel to said rows intersects at least the widened portions of the slots of the two adjacent rows.

References Cited by the Examiner
UNITED STATES PATENTS

| | | | |
|---|---|---|---|
| 1,953,303 | 4/34 | Kohlmann | 85—14 |
| 2,200,649 | 5/40 | Wardle | 85—13 |
| 2,885,749 | 5/59 | Jureit | 20—92 |
| 3,011,226 | 12/61 | Menge | 20—92 |
| 3,016,586 | 1/62 | Atkins | 20—92 |

BENJAMIN BENDETT, *Primary Examiner.*

WILLIAM I. MUSHAKE, EARL J. WITMER,
*Examiners.*